(12) United States Patent
Kontny et al.

(10) Patent No.: US 11,543,000 B2
(45) Date of Patent: Jan. 3, 2023

(54) HYDRAULIC SUSPENSION DAMPER WITH A HYDRAULIC STROKE STOP ARRANGEMENT

(71) Applicant: BeijingWest Industries Co., Ltd., Beijing (CN)

(72) Inventors: Marek Karol Kontny, Balice (PL); Rafal Konrad Kiwior, Balice (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 17/485,459

(22) Filed: Sep. 26, 2021

(65) Prior Publication Data
US 2022/0213946 A1    Jul. 7, 2022

(30) Foreign Application Priority Data
Jan. 7, 2021   (CN) .......................... 202110018285.1

(51) Int. Cl.
*F16F 9/49*   (2006.01)
*F16F 9/26*   (2006.01)

(52) U.S. Cl.
CPC . *F16F 9/49* (2013.01); *F16F 9/26* (2013.01)

(58) Field of Classification Search
CPC ...... F16F 9/49; F16F 9/26; F16F 9/346; F16F 9/3465
See application file for complete search history.

(56) References Cited

U.S. PATENT DOCUMENTS

| | | | | |
|---|---|---|---|---|
| 9,593,697 B2* | 3/2017 | Baalmann | ................. | F16F 9/49 |
| 9,651,110 B2* | 5/2017 | Takeno | ..................... | F16F 9/49 |
| 9,835,220 B2* | 12/2017 | Kontny | ..................... | F16F 9/49 |
| 10,533,624 B2* | 1/2020 | Ishimaru | ................... | F16F 9/49 |
| 10,830,303 B2* | 11/2020 | Kontny | ................... | F16F 9/585 |
| 10,989,268 B2* | 4/2021 | Oliveira | ................ | B60G 13/08 |

(Continued)

FOREIGN PATENT DOCUMENTS

| | | |
|---|---|---|
| DE | 102016224353 A1 | 6/2018 |
| EP | 3176464 A1 | 11/2016 |

(Continued)

OTHER PUBLICATIONS

Extended European Search Report dated May 31, 2022 for counterpart European patent application No. 21211733.7.

*Primary Examiner* — Thomas W Irvin
(74) *Attorney, Agent, or Firm* — William H. Honaker; Dickinson Wright PLLC

(57) ABSTRACT

The disclosure relates to a hydraulic damper provided with an additional stroke stop arrangement comprising a narrowed section and an additional piston assembly, wherein the additional piston assembly comprises a plastic ring guide, a ring, and a retaining member, wherein the ring surrounds an inner axial rim of the ring guide with radial clearance, wherein the inner axial rim defines at least one annular channel, and wherein the ring guide has at least one fixing protrusion extending radially inwardly toward the axis for engaging an annular slot in the piston rod and securing the ring guide to the piston rod. The at least one fixing protrusion is disposed at said inner axial rim of said ring guide and the height of said at least one fixing protrusion is larger than said radial clearance between said inner axial rim of said ring guide and said ring.

20 Claims, 3 Drawing Sheets

(56) References Cited

U.S. PATENT DOCUMENTS

| | | | |
|---|---|---|---|
| 11,067,147 B2 * | 7/2021 | Bruno | F16F 9/49 |
| 11,187,298 B2 * | 11/2021 | Mallin | F16F 9/49 |
| 2015/0090548 A1 * | 4/2015 | Yamanaka | F16F 9/3271 |
| | | | 29/434 |
| 2015/0247549 A1 * | 9/2015 | Takeno | F16F 9/585 |
| | | | 188/297 |
| 2015/0330475 A1 * | 11/2015 | Slusarczyk | B21D 22/20 |
| | | | 72/370.21 |
| 2016/0091046 A1 * | 3/2016 | Soromenho | B60G 13/08 |
| | | | 188/297 |
| 2017/0097063 A1 * | 4/2017 | Kontny | F16F 9/49 |
| 2017/0159743 A1 | 6/2017 | Chyla et al. | |
| 2018/0195574 A1 * | 7/2018 | Ishimaru | F16F 9/49 |
| 2019/0154104 A1 * | 5/2019 | Kontny | F16F 9/486 |
| 2021/0054901 A1 * | 2/2021 | Gross | F16F 9/18 |
| 2021/0131519 A1 * | 5/2021 | Mallin | F16F 9/185 |

FOREIGN PATENT DOCUMENTS

| | | | |
|---|---|---|---|
| EP | 3489541 | A1 | 5/2019 |
| WO | 2018155339 | A1 | 8/2018 |

\* cited by examiner

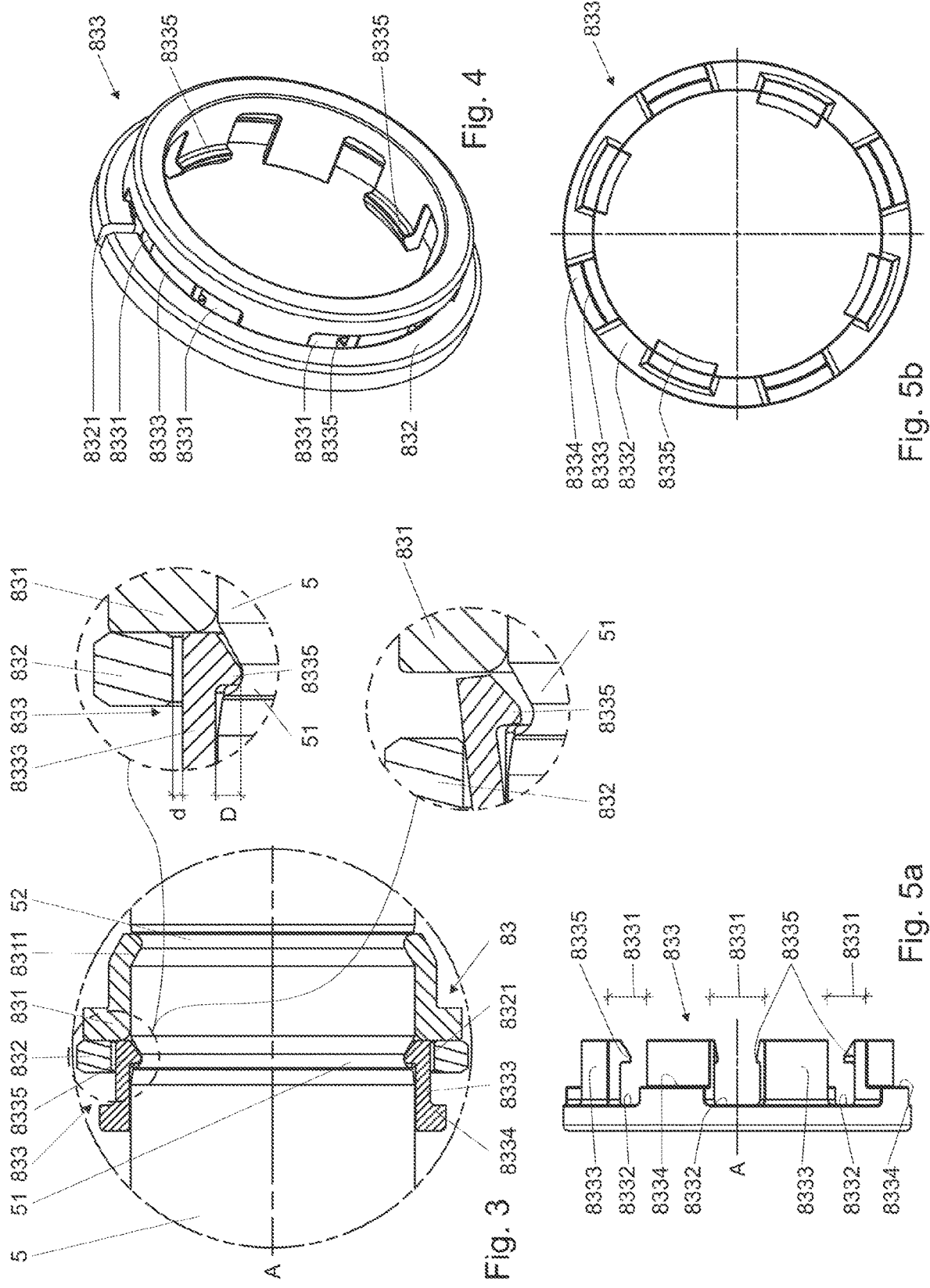

HYDRAULIC SUSPENSION DAMPER WITH A HYDRAULIC STROKE STOP ARRANGEMENT

CROSS-REFERENCE TO RELATED APPLICATION

This application claims priority to Chinese Patent Application No. 202110018285.1, filed on Jan. 7, 2021, which is hereby incorporated by reference in its entirety.

FIELD OF THE INVENTION

The disclosure relates to a hydraulic damper, in particular a motor vehicle hydraulic suspension damper, comprising a tube filled with working liquid, a main piston assembly disposed slidably inside the tube along an axis, dividing the tube into a rebound chamber and a compression chamber and provided with rebound and compression valve assemblies to control the flow of working liquid within the tube during rebound and compression stroke of the damper, a piston rod attached to the main piston assembly and led outside the damper through a sealed piston rod guide, wherein at least one end of the tube is provided with an additional stroke stop arrangement comprising a narrowed section of a diameter smaller than the diameter of the tube, having an inlet opening to the tube and provided at least partially with at least one axial groove having the cross-sectional area decreasing from the inlet along the narrowed section, and an additional piston assembly having a diameter smaller than the diameter of the tube, displaceable along with the main piston assembly configured to be slidably disposed in the narrowed section to generate additional damping force, wherein, the additional piston assembly comprises a plastic ring guide fixed to the piston rod and distal with respect to the main piston assembly, a ring having an annular gap guided by the ring guide and configured to make a sliding fit with the internal wall of the narrowed section of the tube, and a retaining member fixed to the piston rod and proximal with respect to the main piston assembly, wherein the ring surrounds an inner axial rim of the ring guide with radial clearance and is axially displaceable between the retaining member and a retaining surface of the ring guide, wherein the inner axial rim defines at least one annular channel in fluid connection with at least one radial channel defined in the retaining surface, and wherein the ring guide has at least one fixing protrusion extending radially inwardly toward the axis for engaging an annular slot in the piston rod and securing the ring guide to the piston rod.

BACKGROUND OF THE INVENTION

A hydraulic damper provided with a hydraulic rebound stop arrangement of this kind is disclosed in patent publication EP 3 153 738. The ring guide and the ring form a return valve that opens when the additional piston assembly is in the narrowed section of the tube and the direction of the stroke changes to opposite to the direction of the activation of the stop arrangement. The ring guide includes a fixing protrusion disposed at the retaining surface of the ring guide extending radially inwardly from the retaining surface of the ring guide and toward the axis for engaging the piston rod. Furthermore the retaining surface of the ring guide is separated by a number of radial channels defining bridges in-between them.

Therefore, the plastic ring guide is snap-locked on the piston rod. However, it turned out, that during high speed movement of the piston rod in direction opposite to the direction of the activation of the stop arrangement, relatively high pressure acting on the ring abutting the retaining surface of the ring guide acts also on the fixing protrusion(s) and thus may cause unlocking of the ring guide from the piston rod. Furthermore, if the annular gap of the ring aligns with the bridge in the retaining surface during this high speed movement, the bridge may be pushed and stuck inside the gap. Both these situations lead to the failure of the hydraulic stop arrangement. Finally, to ensure proper snap-locking of such a plastic ring guide on the piston rod, axial length of the retaining surface of the ring guide, on which the fixing protrusion(s) is/are disposed undesirably reduces the operational length of the hydraulic stop arrangement.

Publication US2018195574 discloses a hydraulic damper having an additional stroke stop arrangement including a second cylinder provided at an end portion in an inner cylinder, and a second piston configured to move along with movement of a piston rod to be capable of being fit-inserted through the second cylinder. The second piston includes a stopper coupled to the piston rod, a castle integrated with the stopper by plastic flow to form a ring groove on an outer periphery of the second piston between the castle and the stopper, and a piston ring fixed into a ring groove formed by the stopper and the castle so that the piston ring is displaceable in the ring groove in an axial direction and is retained in the ring groove, and has an annular shape with both ends in a circumferential direction which are formed by partially cutting the piston ring. The stopper made of metal is attached on the piston rod by means of annular groove expanded radially outward thereof and engaging portion being a part of the stopper.

Publication WO2018155339 also discloses a similar stop arrangement in a form of a metal holder attached on a piston rod by means of annular claw portion fitted into an annular groove formed on the outer periphery of the piston rod along the circumferential direction.

It has been the object of the present disclosure to provide a hydraulic damper with a hydraulic stop arrangement of a simple construction, providing a smooth increase of damping force at the end of the stroke and versatile damper tuning capabilities, which would be cost efficient, simple to manufacture, would feature a decreased axial height of the ring guide and thus an increased working distance of the stroke stop arrangement, an improved holding function of the ring guide, and which would eliminate the possibility of the ring guide to enter and block in the annular gap of the sealing ring.

SUMMARY OF THE INVENTION

Therefore, a damper of the kind mentioned in the outset, according to the present disclosure is characterized in that said at least one fixing protrusion is disposed at said inner axial rim of said ring guide and the height of said at least one fixing protrusion is larger than said radial clearance between said inner axial rim of said ring guide and said ring.

Thus the ring guide is provided with self-locking assembly clips that engage in an annular groove of the piston rod and are secured at the radially external side by the sealing ring.

Preferably said at least one fixing protrusion is disposed at the end of said inner axial rim of said ring guide proximal with respect to the main piston assembly.

Preferably at least two radial channels defined in the retaining surface are fluidly connected about said inner axial rim.

Preferably the width of the annular section(s) of the retaining surface between the radial channel(s) is larger than the annular gap of the ring.

Preferably said narrowed section of the tube has a form of an insert, preferably made of plastic.

This enables for achieving simplicity of damper construction.

Preferably said stroke stop arrangement is a rebound stroke stop arrangement and said hydraulic damper is a twin-tube damper.

BRIEF DESCRIPTION OF DRAWINGS

The disclosure shall be described and explained below in preferred embodiment and in connection with the attached drawings on which:

FIG. 3 is an enlarged fragment of FIG. 2 illustrating the components of an additional piston assembly of the hydraulic stroke stop arrangement, along with the enlarged fragments illustrating its functionality during the rebound (top) and compression stroke (bottom) following the activation of the hydraulic stroke stop arrangement;

FIG. 4 is a schematic perspective view of a ring guide of the additional piston assembly of the hydraulic stroke stop arrangement; and FIG. 5a and FIG. 5b shows the ring guide in side view (FIG. 5a) and front view (FIG. 5b).

DETAILED DESCRIPTION OF PREFERRED EMBODIMENTS

Figure 1:
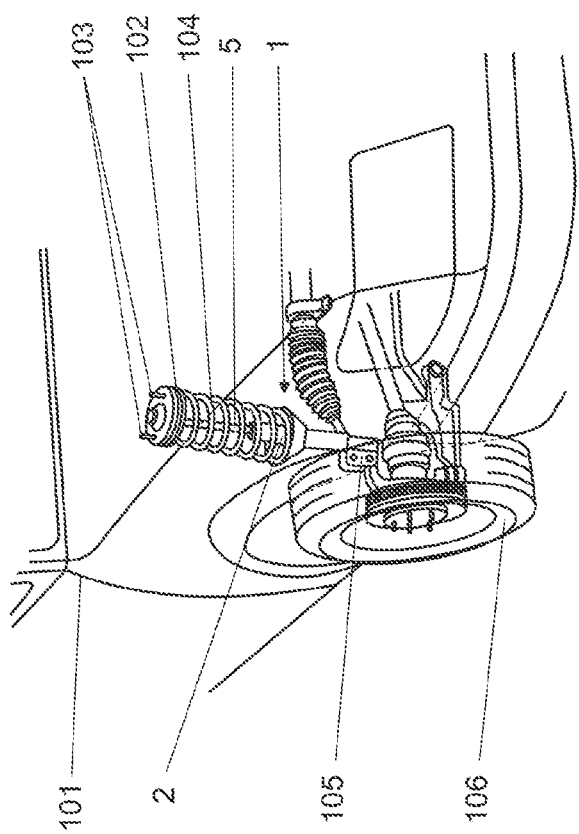
FIG. 1 illustrates a fragment of a vehicle suspension comprising the damper according to the present invention.

FIG. 1 schematically illustrates a fragment of an exemplary vehicle suspension comprising the damper 1 of the present disclosure attached to a vehicle chassis 101 by means of a top mount 102 and a number of screws 103 disposed on the periphery of the upper surface of the top mount 102. The top mount 102 is connected to a coil spring 104 and a piston rod 5 of the damper 1. The tube 2 of the damper 1 is connected to the steering knuckle 105 supporting the vehicle wheel 106.

Figure 2:
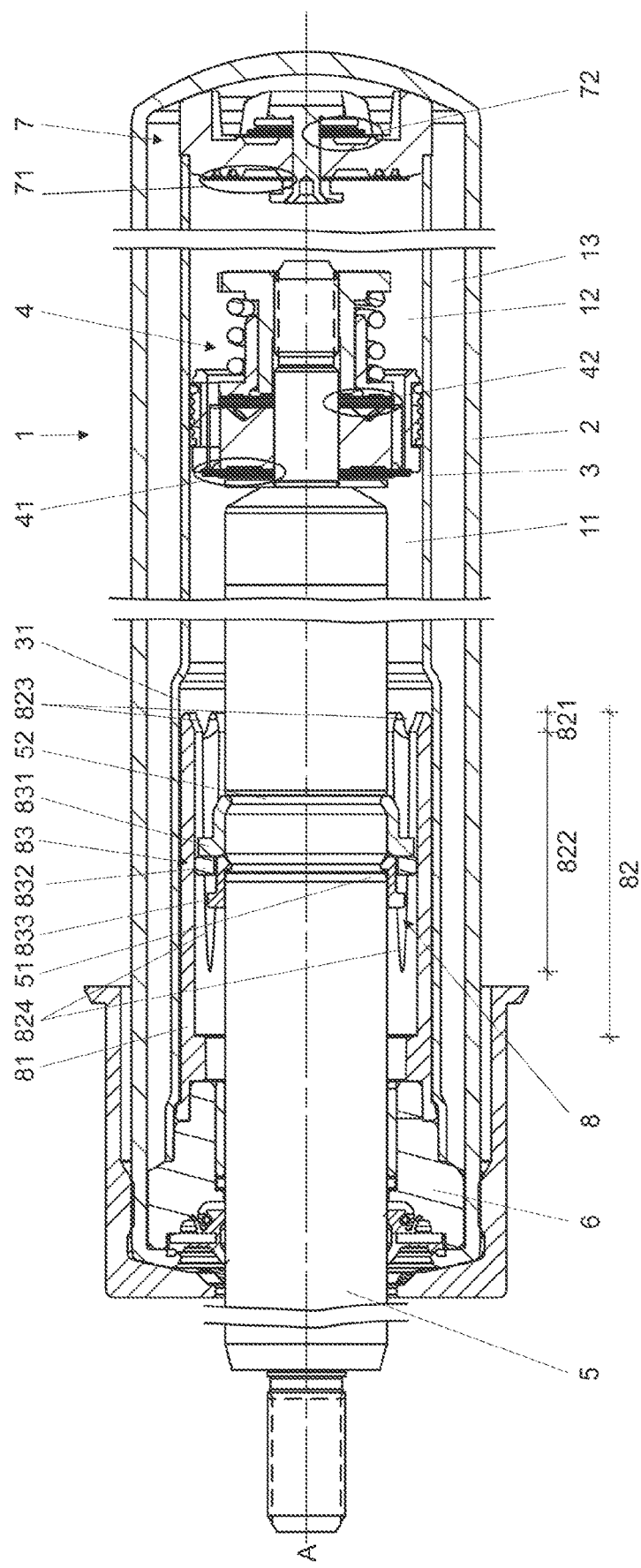
FIG. 2 is a schematic cross-sectional view of an embodiment of a damper according to the present disclosure at the end of the rebound stroke, with the hydraulic stroke stop arrangement activated.

FIG. 2 presents an embodiment of a twin-tube damper 1 according to the present invention. The damper 1 comprises an external tube 2 and a main tube 3 filled with viscous working liquid inside of which a movable piston assembly 4 attached to a piston rod 5 led outside the damper 1 through a sealed piston rod guide 6 is disposed. The damper 1 is also provided with a base valve assembly 7 fixed at the other end of the main tube 3. The piston assembly 4 makes a sliding fit with the inner surface of the tube 3 and divides the tube 3 into a rebound chamber 11 (between the piston rod guide 6 and the piston assembly 4) and a compression chamber 12 (between the piston assembly 4 and the base valve assembly 7). An additional compensation chamber 13 is located at the other side of the base valve assembly 7.

The piston assembly 4 is provided with compression 42 and rebound 41 valve assemblies to control the flow of working liquid passing between the rebound chamber 11 and the compression chamber 12 while the piston assembly 4 is in motion along an axis A. Also the base valve assembly 7 is provided with rebound 71 and compression 72 valve assemblies to control the flow of working liquid passing between the additional compensation chamber 13 and the compression chamber 12, respectively, during rebound and compression stroke of the damper 1. As it is well known to those skilled in the art, the valve assemblies 41, 42 and 71, 72 provide design parameters that may be used to shape desired characteristic of the damper 1 and may comprise a number of flow channels disposed about an axis A, a number of resilient deflectable or movable discs covering that channels and deflecting or moving under the pressure of the working liquid during rebound and compression stroke of the damper 1.

Obviously, as it is known to those skilled in the art, in a case of a monotube damper a slidable partition would be disposed instead of the base valve assembly 7 and pressurized gas would fill the space at the other side of the partition defining a compensation gas chamber instead of the liquid compensation chamber 13.

The damper 1 is further provided with a stroke stop arrangement 8 comprising a narrowed section 82 located in the rebound chamber 11, an additional piston assembly 83 attached to a piston rod 5 and configured to be slidably disposed in said narrowed section 82 to generate an additional damping force at the end of the rebound stroke.

Though in this embodiment the stroke stop arrangement 8 functions as a rebound stroke stop arrangement, it is obvious that it might be additionally or alternatively placed at the end of the compression chamber 12 (above the base valve assembly 7 or above the slidable partition in case of a mono-tube damper) to function as a compression stroke stop arrangement.

In this embodiment the narrowed section 82 has a form of an additional plastic insert 81 fixed in an enlarged section 31 of the main tube 3 and adjoining the piston rod guide 6. It shall be obvious to those skilled in the art that such a narrowed section may easily be formed by proper internal shaping of the tube 3 itself in the rebound chamber 11 or the compression chamber 12 volume.

The narrowed section 82 (formed by the insert 81) is provided with an inlet section 821 and a groove section 822. The inlet section 821 is conically shaped, extends into the rebound chamber 11 and has six equiangularly spaced half-circular radial grooves 823 that extend into the groove section 822 and join with six circular axial grooves 824 having the axes of symmetries slightly slanted with respect to the axis A so that the grooves 824 vanish at some point at the inner surface of the insert 81 along the axis A.

As shown in FIG. 3 the additional piston assembly 83 comprises a plastic ring guide 833, a metal ring 832 surrounding the ring guide 833 with some radial clearance d, and a retaining member 831 adjoining the ring guide 833. The ring guide 833 and the retaining member 831 are respectively distal and proximal with respect to the main piston assembly 4.

The ring 832 is axially displaceable between the retaining member 831 and a retaining surface 8334 of the ring guide 833 and is provided with an annular gap 8321 that enables its radial contraction to some extent.

As shown in FIG. 4 and FIG. 5a and FIG. 5b the ring guide 833 is provided with an inner axial rim 8333 that surrounds the piston rod 5 and is split into eight equiangularly spaced annular channels 8331, defining bridges in-between them, that extend to radial channels 8332 defined in the retaining surface 8334. Furthermore the ring guide 833 is provided with four fixing protrusions 8335 disposed at the inner axial rim 8333. In this embodiment fixing protrusions 8335 are disposed at the end of the inner axial rim 8333 proximal with respect to the main piston assembly 4. Fixing protrusions 8335 extend radially inwardly toward the axis A and engage an annular slot 51 in the piston rod 5, securing the ring guide 833. The metal retaining member 831 is clenched on a piston rod 5 with its fixing protrusion 8311 disposed in the additional annular slot 52 of the piston rod 5. As shown in FIG. 3 the height D of fixing protrusions is larger than the radial clearance d between the inner axial rim 8333 and the ring 832.

As shown in FIG. 2 during the rebound stroke the additional piston assembly 83 after entering the inlet section 821 enters to the groove section 822 of the insert 81 and the ring 832 radially contracts making a sliding fit with the internal wall of the insert 81. At this point fluid pressure builds up in the volume of the insert 81 pressing the ring 832 to the retaining member 831 and the working liquid may flow out of the insert 81 only through the set of axial grooves 824 generating an additional damping force proportional not only to the velocity of the piston rod 5 but also to its position, since the cross-sectional area of the grooves 824 diminishes as the rebound stroke progresses.

Finally the flow of working liquid is no longer possible through axial grooves 824 and large damping reaction is provided. In other embodiments of the disclosure an additional safety spring could be provided in the narrowed section 82 affixed with respect to the piston rod guide 6.

During the backward compression stroke the pressure in the rebound chamber 11 presses the ring 832 to the retaining surface 8334 of the ring guide 833 so that the return flow of working liquid back to the insert 81 is possible not only through an increasing cross-sectional area of the axial grooves 824, but also through annular channels 8331, surrounded by the ring 832 and radial channels 8332 defined in the retaining surface 8334 of the ring guide 833. In this embodiment four pairs of radial channels 8332 are fluidly connected about the inner axial rim 8333.

The ring guide 833 and the ring 832 form therefore a kind of a return valve that opens if only the direction of the stroke changes from rebound to compression and enables for substantially unrestricted filing the insert 81 during the compression stroke. Otherwise, the damping force during backward compression stroke, where the rebound stroke stop arrangement 8 is no longer needed would be comparable to the one during the rebound stroke, where the rebound stroke stop arrangement 8 is desired.

As shown in FIG. 3 high pressure acting on the ring 832 abutting the retaining surface of the ring guide 833 may cause deflection of the fixing protrusions 8335. Nonetheless the ring guide 833 remain secured on the piston rod 5 as this deflection is constrained by the radial clearance d between the inner axial rim 8333 and the ring 832 which is lower than the height D of the fixing protrusion 8335.

The above embodiments of the present disclosure are merely exemplary. The figures are not necessarily to scale, and some features may be exaggerated or minimized. These and other factors, however, should not be considered as limiting the spirit of the invention, the intended scope of protection of which is indicated in appended claims.

LIST OF REFERENCE NUMERALS 1. damper
    11. rebound chamber
    12. compression chamber
    13. compensation chamber
2. external tube
3. main tube
    31. enlarged section
4. piston assembly
    41. rebound valve assembly
    42. compression valve assembly
5. piston rod
    51. annular slot (ring guide)
    52. additional annular slot (retaining member)
6. piston rod guide
7. base valve assembly
    71. rebound valve assembly
    72. compression valve assembly
8. stroke stop arrangement
    81. insert
    82. narrowed section
    821. inlet (conical) section
    822. groove section
    823. radial groove
    824. axial groove
    83. additional piston assembly
    831. retaining member
        8311. fixing protrusion
    832. ring
        8321. annular gap
    833. ring guide
        8331. annular channel
        8332. radial channel
        8333. inner axial rim
        8334. retaining surface
        8335. fixing protrusion
101. vehicle chassis
102. top mount
103. screw
104. spring
105. steering knuckle
106. vehicle wheel

What is claimed is:
1. A hydraulic damper, comprising
a tube filled with working liquid,
a main piston assembly disposed slidably inside the tube along an axis, dividing the tube into a rebound chamber and a compression chamber and provided with rebound and compression valve assemblies to control the flow of working liquid within the tube during rebound and compression stroke of the hydraulic damper, and
a piston rod attached to the main piston assembly and led outside the hydraulic damper through a sealed piston rod guide,
wherein at least one end of the tube is provided with an additional stroke stop arrangement comprising
a narrowed section of a diameter smaller than a diameter of the tube, having an inlet opening to the tube and provided at least partially with at least one axial groove having the cross-sectional area decreasing from the inlet along the narrowed section, and
an additional piston assembly having a diameter smaller than the diameter of the tube, displaceable along with the main piston assembly, and configured to be slidably disposed in the narrowed section to generate additional damping force,
wherein,
the additional piston assembly comprises:
a plastic ring guide fixed to the piston rod and distal with respect to the main piston assembly, a ring having an annular gap guided by the ring guide and configured to make a sliding fit with an internal wall of the narrowed section of the tube, and a retaining member fixed to the piston rod and proximal with respect to the main piston assembly, wherein the ring surrounds an inner axial rim of the ring guide with radial clearance and is axially displaceable between the retaining member and a retaining surface of the ring guide, wherein the inner axial rim defines at least one annular channel in fluid connection with at least one radial channel defined in the retaining surface, and wherein the ring guide has at least one fixing protrusion extending radially inwardly toward the axis for engaging an annular slot in the piston rod and securing the ring guide to the piston rod, wherein, said at least one fixing protrusion is disposed at said inner axial rim of said ring guide and said at least one fixing protrusion having a height that is larger than said radial clearance between said inner axial rim of said ring guide and said ring.

2. The hydraulic damper according to claim 1, wherein said at least one fixing protrusion is disposed at the end of said inner axial rim of said ring guide proximal with respect to the main piston assembly.

3. The hydraulic damper according to claim 2, wherein the at least one radial channel includes at least two radial channels defined in the retaining surface, and the at least two radial channels are fluidly connected about said inner axial rim.

4. The hydraulic damper according to claim 2, wherein the at least one radial channel includes at least two radial channels, and the retaining surface defines an annular section between two of the at least two radial channels and having a width larger than the annular gap of the ring.

5. The hydraulic damper according to claim 2, wherein said narrowed section of the tube has a form of an insert made of plastic.

6. The hydraulic damper according to claim 2, wherein said stroke stop arrangement is a rebound stroke stop arrangement.

7. The hydraulic damper according to claim 2, wherein said hydraulic damper is a twin-tube damper.

8. The hydraulic damper according to claim 1, wherein the at least one radial channel includes at least two radial channels defined in the retaining surface, and the at least two radial channels are fluidly connected about said inner axial rim.

9. The hydraulic damper according to claim 3, wherein the at least one radial channel includes at least two radial channels, and the retaining surface defines an annular section between the radial channels and having a width larger than the annular gap of the ring.

10. The hydraulic damper according to claim 8, wherein said narrowed section of the tube has a form of an insert made of plastic.

11. The hydraulic damper according to claim 8, wherein said stroke stop arrangement is a rebound stroke stop arrangement.

12. The hydraulic damper according to claim 8, wherein said hydraulic damper is a twin-tube damper.

13. The hydraulic damper according to claim 1, wherein the at least one radial channel includes at least two radial channels, and the retaining surface defines an annular section between two of the at least two radial channels and having a width larger than the annular gap of the ring.

14. The hydraulic damper according to claim 13, wherein said stroke stop arrangement is a rebound stroke stop arrangement.

15. The hydraulic damper according to claim 13, wherein said hydraulic damper is a twin-tube damper.

16. The hydraulic damper according to claim 1, wherein said narrowed section of the tube has a form of an insert.

17. The hydraulic damper according to claim 16, wherein the insert is made of plastic.

18. The hydraulic damper according to claim 1, wherein said stroke stop arrangement is a rebound stroke stop arrangement.

19. The hydraulic damper according to claim 1, wherein said hydraulic damper is a twin-tube damper.

20. The hydraulic damper according to claim 1, wherein the hydraulic damper is a motor vehicle hydraulic suspension damper.

* * * * *